United States Patent [19]
Williams et al.

[11] Patent Number: 5,847,660
[45] Date of Patent: Dec. 8, 1998

[54] METHOD FOR AVOIDING INTERFERENCE IN A CABLE TELEPHONY SYSTEM

[75] Inventors: James Mason Williams, Lombard; Jonas Butvila, LaGrange Park, both of Ill.

[73] Assignee: Motorola, Inc., Schaumburg, Ill.

[21] Appl. No.: 560,557

[22] Filed: Nov. 17, 1995

Related U.S. Application Data

[63] Continuation-in-part of Ser. No. 361,064, Dec. 21, 1994, Pat. No. 5,623,422.

[51] Int. Cl.$^6$ ............................................. H04H 1/02
[52] U.S. Cl. ...................... 340/825.03; 348/6; 455/6.1; 455/63; 455/67.3; 375/346; 333/12; 329/318; 370/227; 370/228
[58] Field of Search ....................... 340/825.03; 455/9, 455/17, 6.1, 3.1, 63, 296, 67.3; 348/6, 21; 324/613, 628; 375/254, 346; 333/12; 329/318; 370/215, 225–228

[56] References Cited

U.S. PATENT DOCUMENTS

| | | | |
|---|---|---|---|
| 3,750,022 | 7/1973 | Curry et al. | 455/6.1 X |
| 3,794,923 | 2/1974 | Ellis | 455/6.1 X |
| 5,029,158 | 7/1991 | Reid et al. | 370/226 |
| 5,073,822 | 12/1991 | Gumm et al. | 348/6 X |
| 5,115,514 | 5/1992 | Leslie | 455/9 |
| 5,343,471 | 8/1994 | Cassagnol | 370/401 |
| 5,623,422 | 4/1997 | Williams | 364/514 |

OTHER PUBLICATIONS

Personal Access Communications System Air Interface Standard J–STD–014, particularly Chapter 6, including Sections 6.1.5, 6.6 and 6.7. No month, No year.

Generic Criteria for Version 0.1 Wireless Access Communications Systems (WACS), Issue 1, Oct. 1993, Bellcore, particularly Chapter 6, including Sections 6.1.5., 6.6 and 6.7.

*Primary Examiner*—Brian Zimmerman
*Assistant Examiner*—William H. Wilson, Jr.
*Attorney, Agent, or Firm*—J. Ray Wood

[57] ABSTRACT

Carriers (51) in a cable telephony system (10) are prioritized (70) according to their usability. A local access manager (LAM) (27) creates a frequency list that ranks the carriers (51) based upon their frequency. When a cable fixed access unit (CFAU) (44) requests a traffic channel, the LAM (27) selects a traffic channel based on the channel's carrier usability. The LAM (27) also selects an alternative channel based on both the channel's carrier usability and the based on the number of carriers between the traffic channel and the alternate channel in the frequency list. When either the LAM (27) or the CFAU (44) determines the traffic channel is unacceptable during a call they transmit a "Switching to Alternate Channel" message. The CFAU (44) retunes to the alternate channel and transmits a "Re-Connect" request. The LAM (27) then transmits a new alternate channel and the call continues.

20 Claims, 9 Drawing Sheets

METHOD FOR AVOIDING INTERFERENCE IN A CABLE TELEPHONY SYSTEM

RELATED APPLICATIONS

The present application is a continuation in part of the following invention, which is assigned to the assignee of the present invention: Method for Prioritizing Channels in a Communication System invented by James M. Williams, having Ser. No. 08/361,064 and filed on Dec. 21, 1994, now U.S. Pat. No. 5,623,422.

FIELD OF THE INVENTION

The present invention relates, in general, to communication systems and, more particularly, to a method for avoiding interference in a cable telephony system.

BACKGROUND OF THE INVENTION

In cable distribution systems, the system is sealed to prevent the radio frequency (RF) signals from leaking out into the surrounding areas as well as prevent leakage "ingress" into the cable system. This type of ingress can be due to typical wireless systems (e.g., dispatch, cellular, etc.) as well as other types of equipment (e.g., radiation from commercial, medical, and industrial equipment).

When ingress occurs in the downstream spectrum of the cable (the portion currently used for video transmissions) it may be seen as distortion (such as snow) on the picture or effect the sound. The upstream and downstream portions will both be carrying other signals such as voice and data, which may also be corrupted.

Presently, it is expected that ingress is likely to be narrow band in nature (on the order of tens of kilohertz, kHz) and located more in the upstream portion of the cable spectrum. In addition, ingress will be more disruptive to a cable exchange services which provide for alternate, competitive, basic telephony services in local exchange areas or for alternate access to inter-exchange services. The cable exchange service may also provide other special services such as data, ISDN, digital video phone, and interactive multi-media services.

Therefore, it would be desirable for the operators of such a system to minimize the potential distortion and provide a system having optimal performance.

DETAILED DESCRIPTION OF THE DRAWINGS

Figures 1, 2:
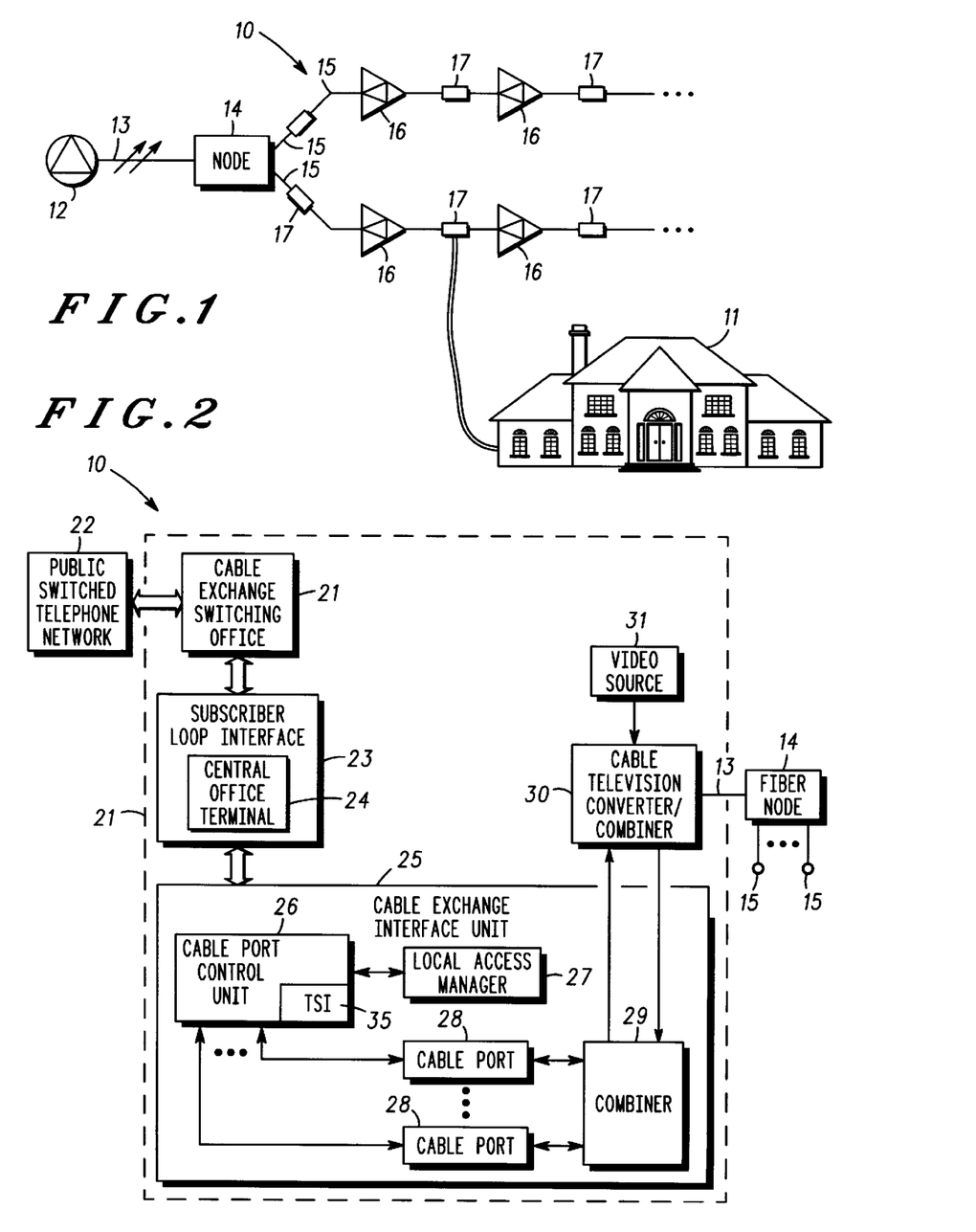
FIG. 1 is a block diagram of a basic cable television system.
FIG. 2 is a more detailed block diagram of the headend of the system of FIG. 1.

While capable of being used in most communication systems, the present invention will be described primarily in connection with cable type communication systems. Cable systems, such as cable television (CATV) networks, are typically configured in a tree-and-branch backbone arrangement. Referring initially to FIG. 1, a block diagram of a basic CATV communications system, generally designated 10, is illustrated.

System 10 shows the tree-and-branch arrangement in which a plurality of subscribers 11 share a common branch. Basically, system 10 consists of a headend 12, described in more detail below, and, preferably, a fiber link 13 to a fiber node 14. Each fiber node 14 will typically have a coaxial cable 15 leading therefrom. Inserted along coaxial cable 15 is a series of amplifiers 16 and taps 17. As illustrated here, amplifiers 16 are two way amplifiers. Two way amplifiers are illustrated because of the utilization of the cable network to transport information in both directions.

Referring now to FIG. 2, a more detailed block diagram of headend 12 of system 10 is provided. Headend 12 consists of a cable exchange switching office (CESO) 21 coupled to a public switched telephone network (PSTN) 22. PSTN 22 is the outside network which receives and transmits various signals (i.e., voice, data, video, etc.). Included with CESO 21 at headend 12 is the subscriber loop interface 23 which may contain a central office terminal (COT) 24. The signals are connected to a cable exchange interface unit (CEX) 25. CEX 25 is comprised of a cable port control unit (CPCU) 26, a local access manager (LAM) 27, a plurality of cable ports (CPs) 28, and a combiner 29. Cable exchange interface 25 is coupled to a CATV converter/combiner 30; which is also coupled to a video source 31 and to the rest of the CATV network through fiber link 13.

Subscriber loop interface 23 is used to couple CPCU 26 to CEX 21. Digital carrier facilities, such as T1 or E1 may be used for this connection. The multiplexing and signaling format will conform to one of the major standards for digital subscriber loop transport. Such major standards include those described in Bellcore documents TR-TSY-000008, TR-NWT-000303, or the European Standards Institute documents V5.1 or V5.2. For CEXs with integrated subscriber loop capabilities, the dedicated subscriber line appearances are virtual, in which case COT 24 would not be required. With other CEXs, the subscriber lines would be physical in the form of analog lines; would require the use of COT 24.

Within cable exchange interface unit 25, CPCU 26 interfaces to a plurality of CPs 28. This also provides the functions necessary to support the data link layer of the cable exchange access interface (CEAI) which is the transport, signaling, and control protocol used between headend 12 and subscriber premises equipment 40 of FIG. 3. The CEAI is similar in many respects to an air interface typically used in shared wireless radiotelephone systems. An example of a potential interface is provided in the Bellcore document "Generic Criteria for Version 0.1 Wireless Access Communications (WACS)", Issue I (October 1993). The CEAI proposed herein has the following structure:

Frequency Band: Downstream: 50–750 MHz Upstream: 5–42 MHz
Duplex Method: Frequency Division Duplex (FDD)
Voice Coding: 64 kbps Pulse Code Modulation (PCM)
Multiplexing: Time Division, 8 slots per frame
Burst Structure: 240 bits per time slot
Frame Rate: 400 frames per second
Bit Rate: 768 Kilobits per second (Kbps)
Carrier Spacing: 600 kilohertz (KHz)
Access Method: At least one RF traffic link in each cable branch is marked as "Idle and Available" by the system. The subscriber acquires frame synchronization with idle traffic link by means of a known bit pattern used in a digital correlation process. The subscriber terminal then initiates access on the idle traffic link.

The functions provided by CPCU 26 include: transcoding between the pulse code modulation (PCM) of subscriber loop interface 23 and voice coding scheme of the CEAI physical channel structure, and multiplexing/demultiplexing traffic and control channels on both the CEAI and subscriber loop interface 23.

CPCU 26 contains a time slot interchanger (TSI) 35 used to interconnect any time slot in subscriber loop interface 23 with another in the CEAI facilities of cable ports 28. CPCU 26 also interfaced to LAM 27 to transfer signaling and control messages. It should be noted here that LAM 27 may be integrated into CPCU 26.

LAM 27 is used to terminate the signaling channels of the digital subscriber loop and CEAI 25 and performs any needed protocol conversions. LAM 27 provides the logic to control the system information broadcasting, alerting, access, authentication, and encryption processes on CEAI 27. Further, LAM 27 correlates the subscriber terminal identity with the appropriate subscriber line appearance; and manages time slot interconnections by TSI 35 in CPCU 26.

Cable ports 28 contain one or more digital transceivers, tuned to operate on pairs of radio frequency (RF) carriers. These may also be integrated into CPCU 26.

Converter/combiner 30 converts modulated RF carriers received from the video sources and from CPs 28 into the proper frequencies within the cable spectrum. These signals are then combined and used to modulate an optical carrier for downstream transmission. Converter/combiner 30 also demodulates and converts the upstream optical carriers to their proper RF frequencies. These RF carriers are then passed to CPs 28.

Video sources 31 are sources of television programming from any of various sources such as: video tape, satellite transmissions, off-the-air TV broadcasts, etc.

Fiber node 14 is used to convert, bi-directionally, between the optical domain of the fiber backbone and the electrical domain of the coaxial distribution network.

Figure 3:
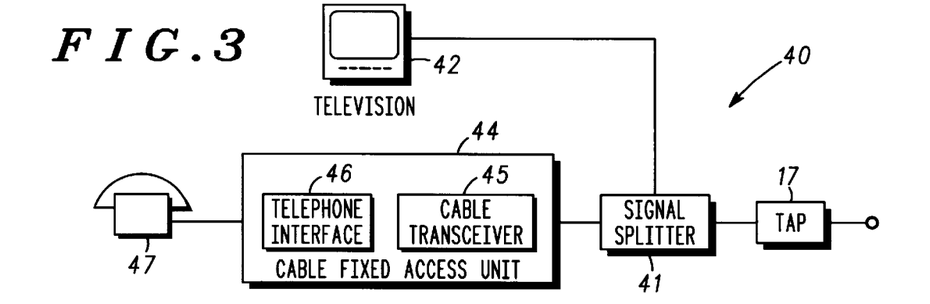
FIG. 3 is a block diagram of the subscriber premises equipment.

Referring now to FIG. 3, a block diagram of the subscriber premises equipment, generally designated 40, is illustrated. Subscriber premises equipment 40 consists of a signal splitter 41 used to divide the signal in order to provide it to various devices. In this example, the signal is being provided to a television 42 and a phone 43. The signal provided to phone 43 is processed thorough a cable fixed access unit (CFAU) 44. CFAU 44 consists of a cable transceiver 45 and a telephone interface 46.

The above described system uses a trunked transport technology. A trunked system is one in which the traffic channel is not dedicated to a particular user, but is available to all users. In connection with the foregoing and following discussion, it will be understood by those skilled in the art that many of the processes described, including those relating to the present invention, may be carried out by digital and analog hardware and related software. This hardware and software may be located, as an example, in headend equipment, such a the CPCU 26, or in a subscriber unit such as the CFAU 45, or in a general purpose computer, depending upon the application.

Figure 4:
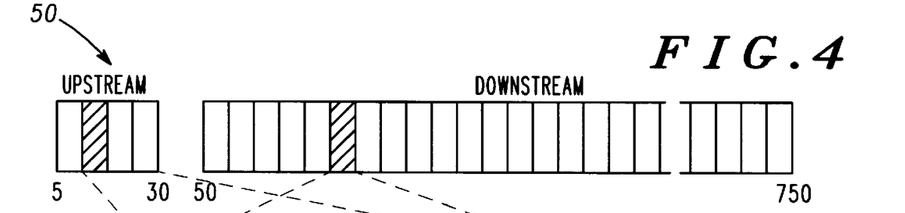
FIG. 4 is a chart showing spectrum allocation in a cable communication system.

In a cable system, a certain amount of cable spectrum is usable. One distinction between a cable system and a wireless system is that all of this spectrum can be reused in each branch of the cable system. In FIG. 4, a spectrum chart, generally designated 50, is shown illustrating one potential allocation of carriers 51. As illustrated, the downstream portion of the spectrum is much larger than the up stream portion. This is dictated by the requirements of the system. Presently, the downstream is needed to carry a large number of conventional television channels. This same capacity is not used on the upstream.

In a preferred system, there may be 120 channels, each 6 MHz in width, used to carry the television signals. In a network offering a cable exchange service, a portion of the downstream spectrum, typically an integer multiple of 6 MHz, and an equivalent spectrum in the upstream is dedicated to a plurality of trunked traffic channels serving a large number of subscribers having telephone and/or other two-way services. According to the CEAI standards set forth above, the RF carriers are spaced 600 kHz apart and each carries eight digitally encoded time division multiplexed information bearing traffic channels. The channels are sometimes referred to as slots, and eight slots makes a frame. The system is designed as a frequency division duplex (FDD) system which means that carriers are utilized in pairs with one for the upstream and the other for the downstream. An upstream carrier is typically matched with a downstream carrier to form a duplex pair either by means of a fixed, pre-determined relationship, or dynamically under the control of CPCU 26 as the need for additional traffic carrying capacity arises.

Figure 5:
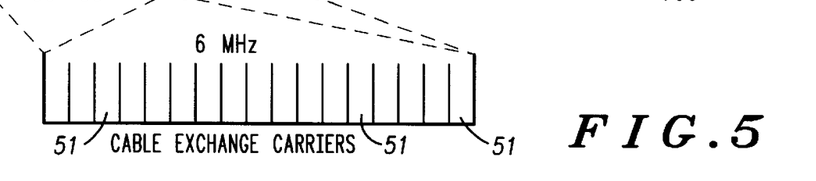
FIGS. 5 and 6 are block diagrams illustrating the structure of the frames and slots of downstream and upstream transmissions, respectively.

As indicated above, each frame has eight slots. Each slot contains 240 bits. The bits in a slot are divided as shown in FIG. 5 (downstream) and FIG. 6 (upstream). In the downstream slot of FIG. 5, the following bits are allocated for each portion:

TABLE 1

| DOWNSTREAM BIT ALLOCATION | |
| --- | --- |
| Synchronization Channel (SYC) | 25 bits |
| Slow Channel (SC) | 35 bits |
| Fast channel (FC) | 160 bits |
| Cyclic Redundancy Code (CRC) | 20 bits |

Figure 6:
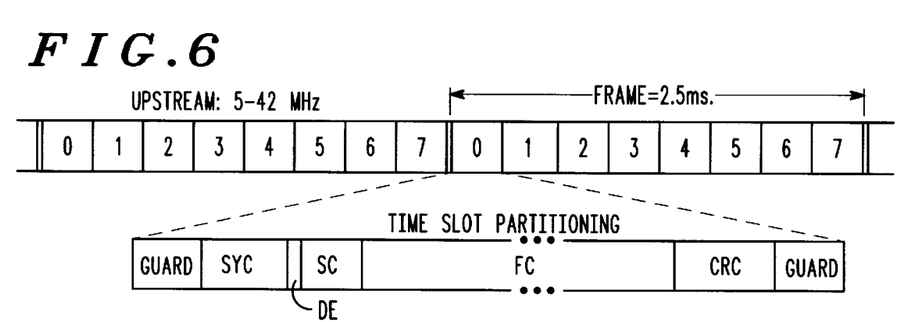

In the upstream slot of FIG. 6, the bits are allocated as follows:

TABLE 2

| UPSTREAM BIT ALLOCATION | |
| --- | --- |
| Guard | 8 bits |
| Synchronization Channel (SYC) | 14 bits |
| Differential Encoding (DE) | 2 bits |
| Slow Channel (SC) | 28 bits |
| Fast Channel (FC) | 160 bits |
| Cyclic Redundancy Code (CRC) | 20 bits |

In the system design, the location of the upstream and downstream spectrum allocated for cable exchange service is known to the CFAUs. When a CFAU is first brought on line, it will automatically scan the downstream carriers attempting to acquire frame synchronization with the system broadcast channel (SBC) which occupies one of the time slots on one of the carrier pairs in each branch of the cable system.

Every downstream time slot is marked with a unique bit pattern Indicating a possible assignment. Those assignments may include the following:

TABLE 3

CHANNEL ASSIGNMENTS

System Broadcast Channel - System Information & Alerting;
Traffic Channel - Idle, Unavailable;
Traffic Channel - Idle, Full Rate (64 Kbps or less);
Traffic Channel - Idle, Half Rate (32 Kbps or less);
Traffic Channel - Idle, Quarter Rate (16 Kbps or less);
Traffic Channel - Idle, Eighth Rate (8 Kbps or less);
Traffic Channel - Idle, for contention access;
Traffic Channel - Idle, for priority access; and
Traffic Channel - Busy.

The SBC contains two logical information streams: the system information channel (SIC) and the alerting channel (AC). When a CFAU locates the SBC, it will listen to the SIC for information of general interest to all terminal devices and then access the system to conduct a registration transaction so that it may be assigned an Alert Identification. For the registration access, frame synchronization is acquired via the same kind of digital correlation process as for the SBC acquisition except that the bit pattern for an available, idle traffic channel, is used. After registration, the CFAU will re-acquire the SBC and listen to the AC for notification of incoming calls.

These systems also include a provision for alternative link transfer (ALT) so that a subscriber unit (SU), engaged in an ongoing call, may be transferred to a different radio link wherever the original link becomes degraded. In order to accomplish this, it would be desirable to use a method that provides improved quality and minimizes the impact seen by the users. To effect these goals, the system should be designed to: detect the onset to interference on a carrier; and effect the transfer of active calls to an alternate carrier when interference is detected. The pairing of particular upstream and downstream carrier frequencies to be used for the SBC are determined by CPCU 26. It is important that the best available selection be made so that the system may operate with minimal disruption. CPCU 26 makes its selections with reference to lists of candidate carrier frequencies ordered according to various measures of usability. Since the upstream and downstream carrier frequencies are managed separately, two sets of these lists are maintained by CPCU 26, operating in conjunction with CPs 28 and CFAUs 44. The procedures are described below in general terms. It should be kept in mind that the results of these procedures are applied independently to the lists for both upstream and downstream carriers.

For any carrier set to which one or more users are actively assigned, the receiver in CFAU 44 measures usability data for the downstream carrier and reports the results, along to a CP 28. The receiver in the CP 28 measures the upstream carrier and reports those results, along with the downstream results sent by CFAU 44, to CPCU 26. All usability data are collected and reported automatically and continuously.

For carrier frequencies that are not in active use, any idle CP 28 can be used in conjunction with special CFAUs located at the ends of cable branches to routinely establish traffic on otherwise unused frequency sets. This will enable the usability of such carriers to be determined and recorded. When idle, a test CFAU 44 would simply monitor the system alerting channel. As part of its normal operation, CPCU 26 would select a pair of unused frequencies, set up the extra CP 28 to use those frequencies, send an alert to the test CFAU 44 and assign the test CFAU 44 to the selected channel set. The extra CP 28 and the test CFAU 44 would then perform a simple test session during which usability data would be obtained in the normal way.

In measuring usability, the process measures word error rate (WER) and signal quality (SQ). These two measures are then used to determine usability. The signal quality measure, in this preferred embodiment, in the eye opening of the signal. However, it will be understood by those of skill in the art that there are many different measures of signal quality, such as signal strength, and that the present invention is not limited to these particular measures. It should be understood here that while a carrier will have several traffic channels (e.g. time slots) that the usability of a carrier will typically impact all of the traffic channels on a carrier, not just one.

Figures 7, 9:
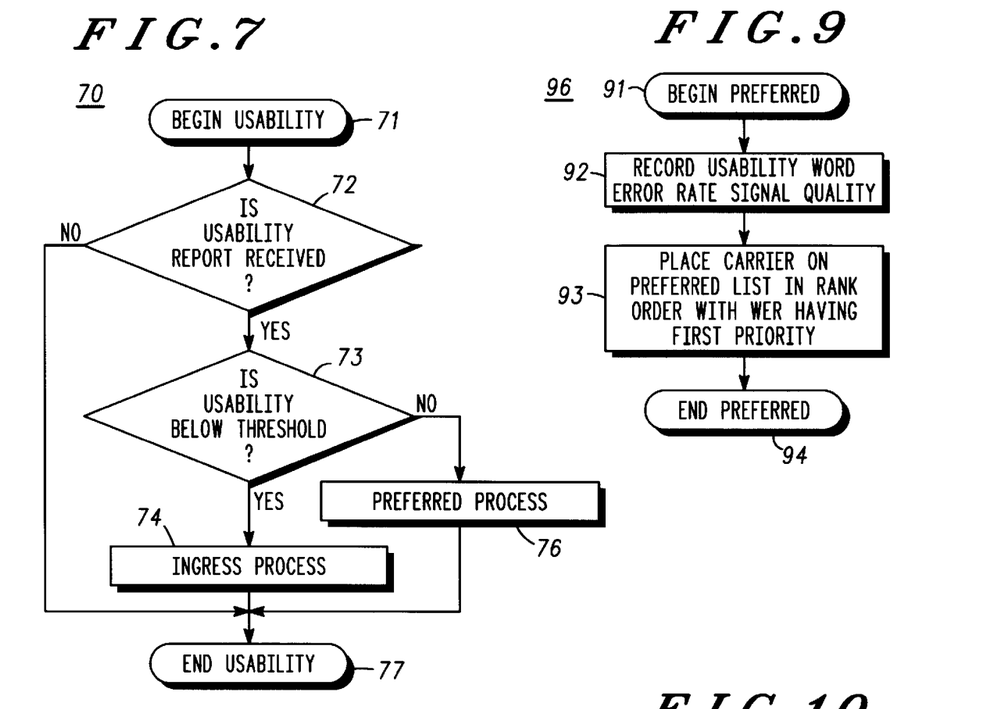
FIGS. 7–9 are flow charts of a process embodying a method for prioritizing channels in a communication system.

Referring now to FIG. 7, a flow chart of a method of prioritizing channels by usability, generally designated 70, embodying the present invention is illustrated. In this preferred embodiment, method 70 is controlled by CPCU 26, but could be conducted in any processing location at head-end 12 and may additionally involve the CFAU 44. Method 70 commences at step 71 and determines if a usability report (or other indication of usability) was received, decision step 72. This request may be the result of a standard routine (such as reports provided from the CPs) or the result of some perceived problem. It should be understood here that while a carrier will have several traffic channels (e.g., time slots) that interference on a carrier will typically impact all of the traffic channels on a carrier, not just one. If no usability report was received, method 70 ends, step 77.

If a usability report has been received, decision step 72, then method 70 determines if the usability reported is below a threshold, decision step 73. If the usability is below the threshold, an INGRESS subprocess 74 is implemented. If the usability is not below a threshold, then a PREFERRED subprocess 76 is entered. Following either subprocess 74 or 76 method 70 ends, step 77.

Figure 8:
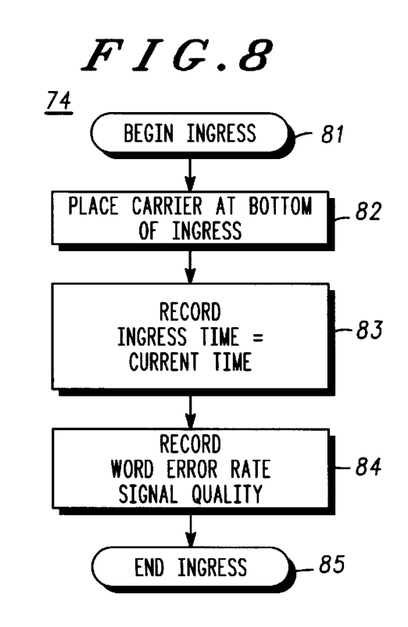
Figure 12:
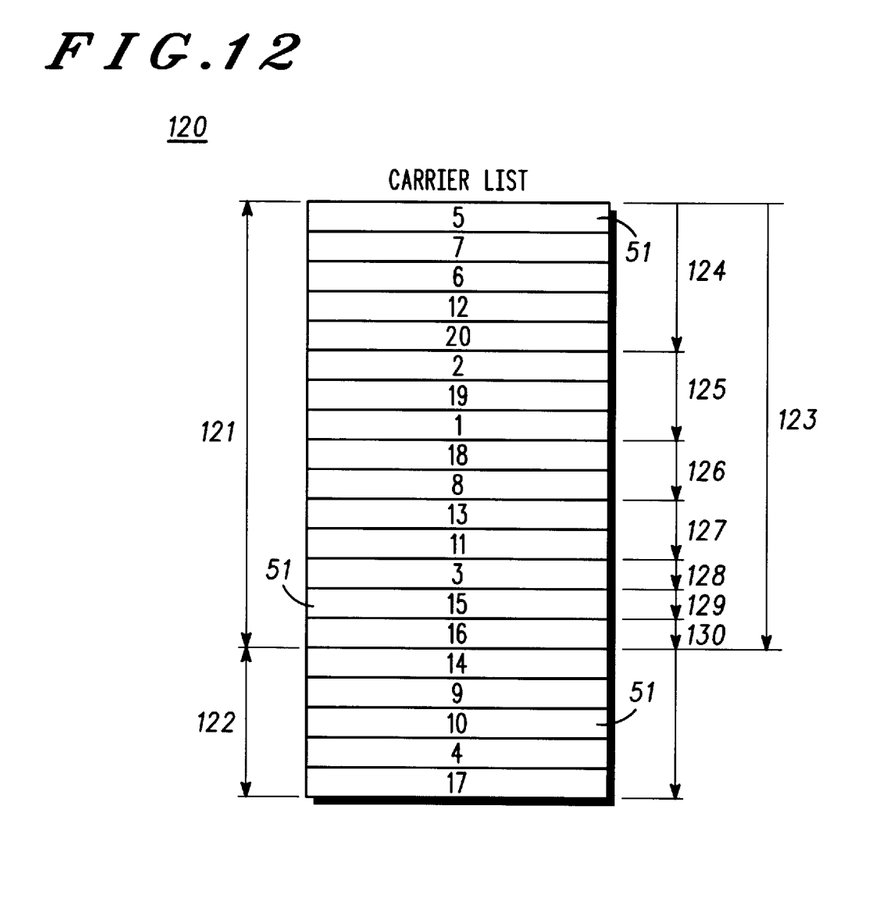
FIG. 12 is a block diagram of a carrier list

Subprocess INGRESS 74 is illustrated in more detail in FIG. 8. Subprocess 74 begins at step 81 and places the carrier on the bottom of an ingress list 122, FIG. 12. It should be noted here that even carriers already on ingress list 112 have their usability determined periodically so that being on the bottom of the list simply means that the carrier is the latest in time for which ingress was detected. Next, subprocess 74 records the current time as the latest time of ingress for the particular carrier, step 83. The usability data, WER and SQ, is then recorded in step 84. Finally, subprocess 74 returns to process 70, step 85.

If the carrier does not have a usability below threshold, decision step 73 of FIG. 7, then PREFERRED subprocess 76 is executed. This is illustrated in more detail in FIG. 9. Subprocess 76 orders a preferred list according to usability, which may involve a single usability parameter or, as in this preferred embodiment, multiple parameters. Subprocess 76 commences at step 91 and records the usability parameters, WER and SQ, step 92. The carrier is then placed on the preferred list in rank order with, in this embodiment, the WER having priority, step 93. This is illustrated by portion 123 of list 120 of FIG. 12. As illustrated, this is also the entire portion of preferred list 121. Within each WER ranking, carriers having the same WER are ranked according to their SQ. These are illustrated by the groups 124–130 of list 120, FIG. 12. Subprocess 76 then ends, step 94, and returns to method 70.

Figure 10:
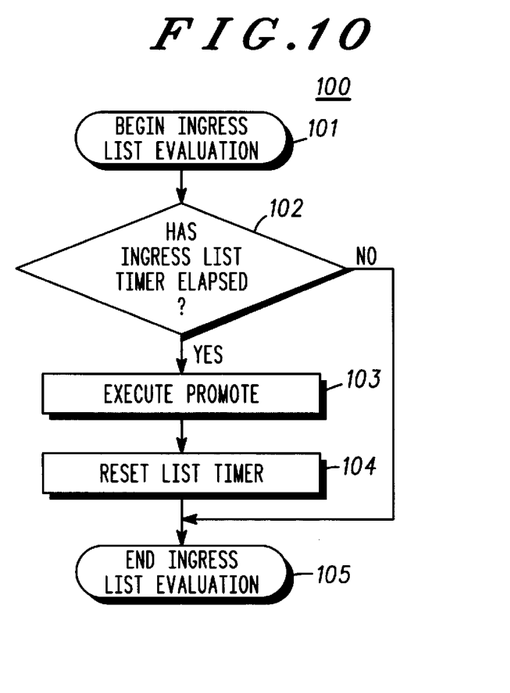
FIGS. 10 and 11 are flow charts of a process embodying a method for evaluating an ingress list.

As mentioned above, once a carrier is placed on an ingress list it is removed from that list after a predetermined time if no further ingress is detected. This process, generally designated 100, is illustrated in FIG. 10 starting at step 101. At selected intervals, process 100 evaluates the carriers currently on any ingress list to determine if any are eligible for promotion to a preferred list. Process 100 first examines an ingress list time to determine if it is time to evaluate the ingress list, decision step 102. If not, process 100 ends, step 105, and CPCU continues on with its normal control activities. If it is determined in decision step 102 that the ingress list time has expired, then PROMOTE subprocess 103 is executed.

Figure 11:
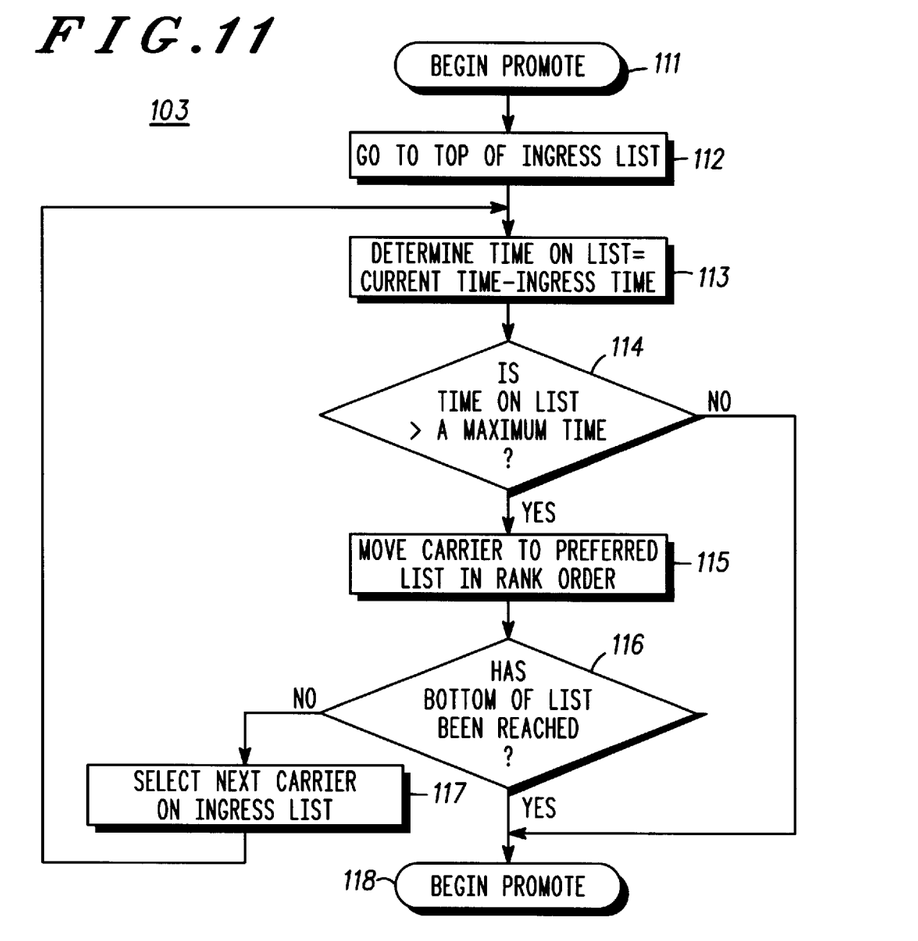

Subprocess 103 is illustrated in more detail in FIG. 11 beginning with step 111. Process 103 starts with the top of the ingress list, step 112, since the carrier most recently experiencing ingress is always placed at the bottom of the ingress list. Next, in step 113, subprocess 103 determines the amount of time the carrier has been on the ingress list by subtracting the ingress time (e.g., the time the carrier was placed on the ingress list) from the current time. Subprocess 103 then determines if the time on the list exceeds some predetermined maximum time, decision step 114. If the time on the list does not exceed the maximum time, then it is known that no other carriers on the ingress list have been on the list long enough to be promoted and subprocess 103 ends.

If the time determined in decision step 113 is greater than a maximum time, then the carrier is moved to a preferred list, step 115, and ranked in the manner using subprocess 74, FIG. 9. Subprocess 103 then determines if the bottom of the ingress list has been reached, decision step 116. If not, then the next carrier is selected, step 117, and subprocess 103 loops back to step 113. If the bottom of the list has been reached, then subprocess 103 ends, step 118, and returns to process 100.

Returning to FIG. 10, an ingress list timer is reset, step 104, and process 100 ends, step 105. At this point CPCU 26 continues with other control activities.

Figure 13:
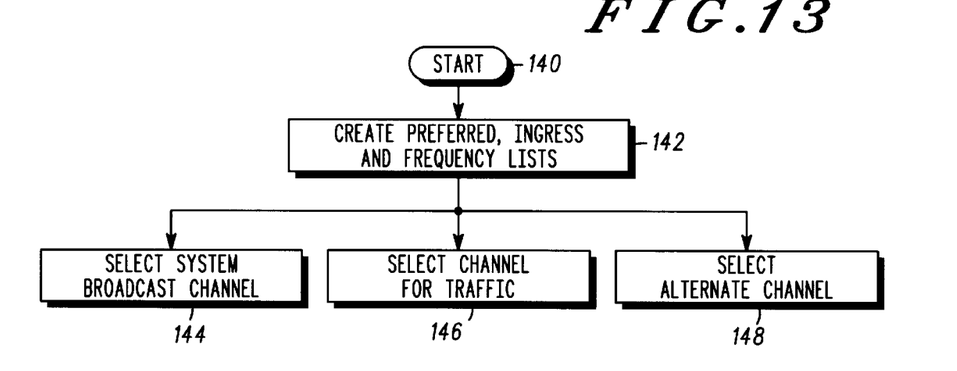
FIG. 13 is a flow chart of a process of selecting channels in a communication system

These lists are used by the LAM 27 to assign carriers for a broadcast channel, assign traffic channels, or use for link transfer purposes. FIG. 13 shows the process for using the list to allocate idle channels to various channel types. The process starts, step 140, by creating the preferred list, the ingress list and a frequency list, step 142. The frequency list ranks all the carriers according to their frequency. These lists are then used to select carriers and time slots for: the system broadcast channel, step 144; the traffic channels, step 146; and the alternative channels, step 148. The system broadcast channel is selected by choosing the carrier at the top of the preferred list. If the LAM determines it is necessary to re-assign the SBC to a different carrier, the new channel will be marked as a SBC and the SIC and AC transmission will begin on that channel as well as the old one. A "SBC Transfer" message will then be transmitted in the SIC on the old SBC identifying the new SBC carrier. All idle CFAUs will re-tune to the new carrier and sync to the new SBC time slot. The old SBC time slot will then be marked as idle.

The LAM 27 chooses carriers toward the top of the preferred list as being available as traffic channels. However, when there are no idle time slots on any of the carriers on the preferred list, the LAM may use carriers from the ingress list. Information identifying one or more carriers with marked idle time slots will be transmitted on the SIC to idle CFAUs via an "Access Carrier Id" message. Frequently, more than one carrier will have a marked idle time slot in order to minimize contention during periods of high access activity.

Figure 14:
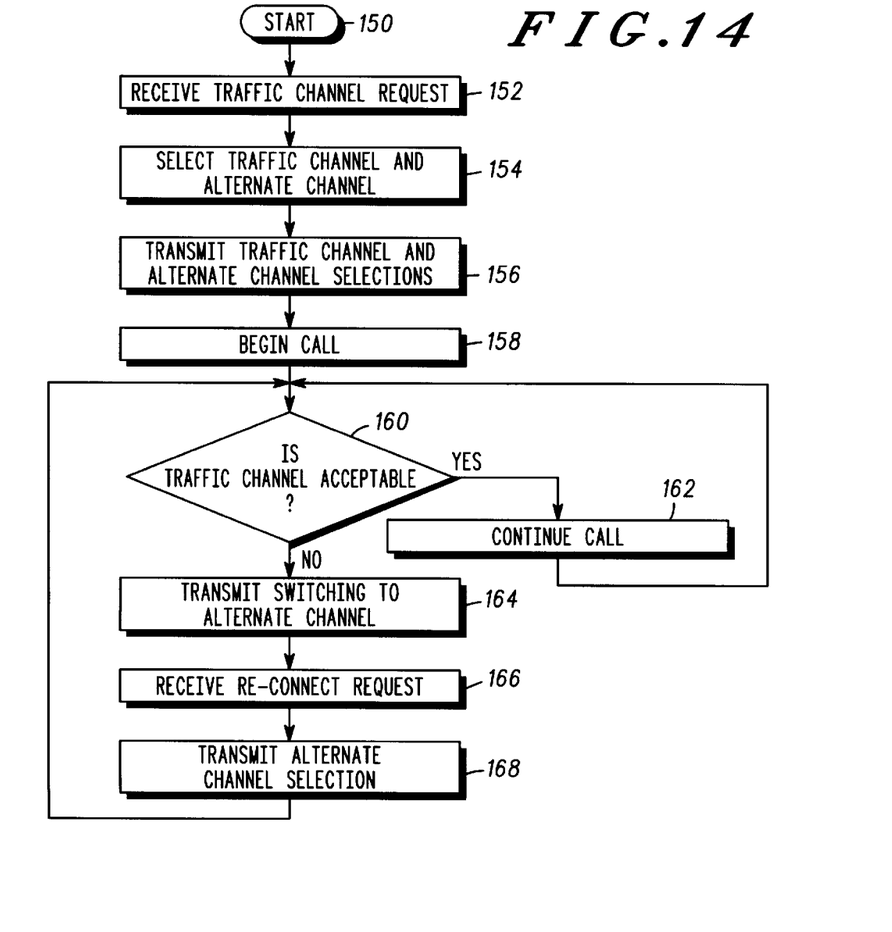
FIG. 14 is a flow chart of a process of a process embodying a method for switching to an alternate channel.

An embodiment of the steps in the process of switching to an alternate channel by the LAM 27 is shown in FIG. 14. The process starts, step 150, by receiving a traffic channel request, step 152. A traffic channel and an alternate channel are selected by the LAM, step 154. The process for selecting a traffic channel was described earlier. The process for selecting an alternate channel is explained in conjunction with FIG. 15. The LAM transmits, step 156, its selection for the traffic channel and the alternate channel to the CFAU that requested a traffic channel at step 152. A telephone call starts, step 158. The LAM determines if the traffic channel is acceptable, step 160. When the traffic channel is acceptable the telephone call continues, step 162, and processing returns to step 160. When the traffic channel is not acceptable, the LAM transmits a "Switching to Alternative Channel" message, step 164. Alternatively the LAM, may receive from the CFAU, the "Switching to Alternative Channel" message. Either way the LAM then retunes the CP to the alternative channel and waits until it receives a "Re-Connect Request" message, step 166. The LAM then transmits a new alternate channel, step 168. The process then returns to step 160.

Figure 15:
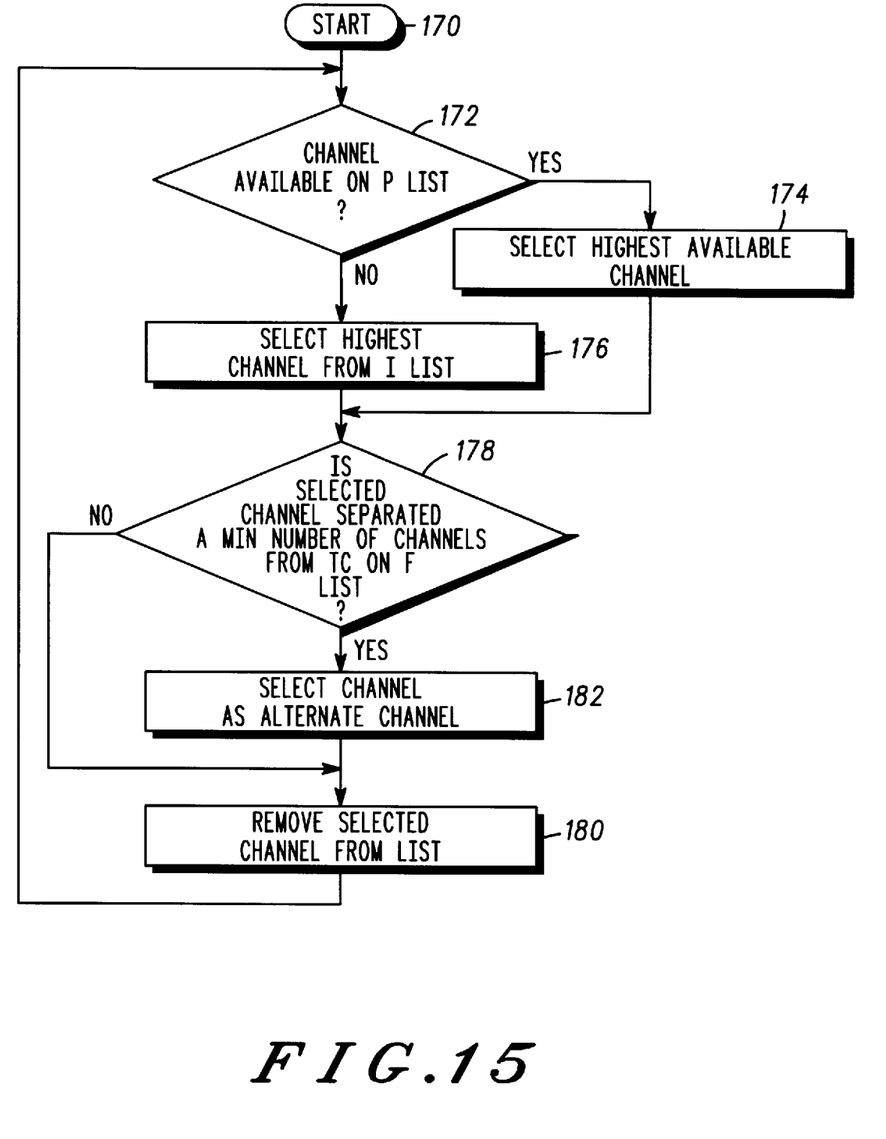
FIG. 15 is a flow chart of a process of a process embodying a method for selecting an alternate channel.

An embodiment of the process the LAM performs to select an alternative channel is shown in FIG. 15. The process starts, step 170, by determining if a carrier is available on the preferred list, step 172. When a carrier is available from the preferred list, the highest available carrier on the preferred list is selected, step 174. When a carrier is not available from the preferred list, the highest available carrier on the ingress list is selected, step 176. Once a carrier has been selected it is determined if the selected carrier is a minimum number of carriers away from the traffic channel on the frequency list, step 178. This insures that the alternate channel and the traffic channel are separated by a minimum distance along the frequency spectrum. As a result it is unlikely that the traffic channel and alternate channel will be effected by the same interference. When the traffic channel and the selected carrier are not separated by the minimum number of carriers, the carrier is removed from the list of candidates, step 180. The process then returns to step 172. When the traffic channel and the selected carrier are separated by the minimum number of carriers, one of the slots on the carrier is selected as the alternate channel, step 182. Several, alternate channels may be selected and transmitted to the CFAU at step 154 of FIG. 14.

Figure 16:
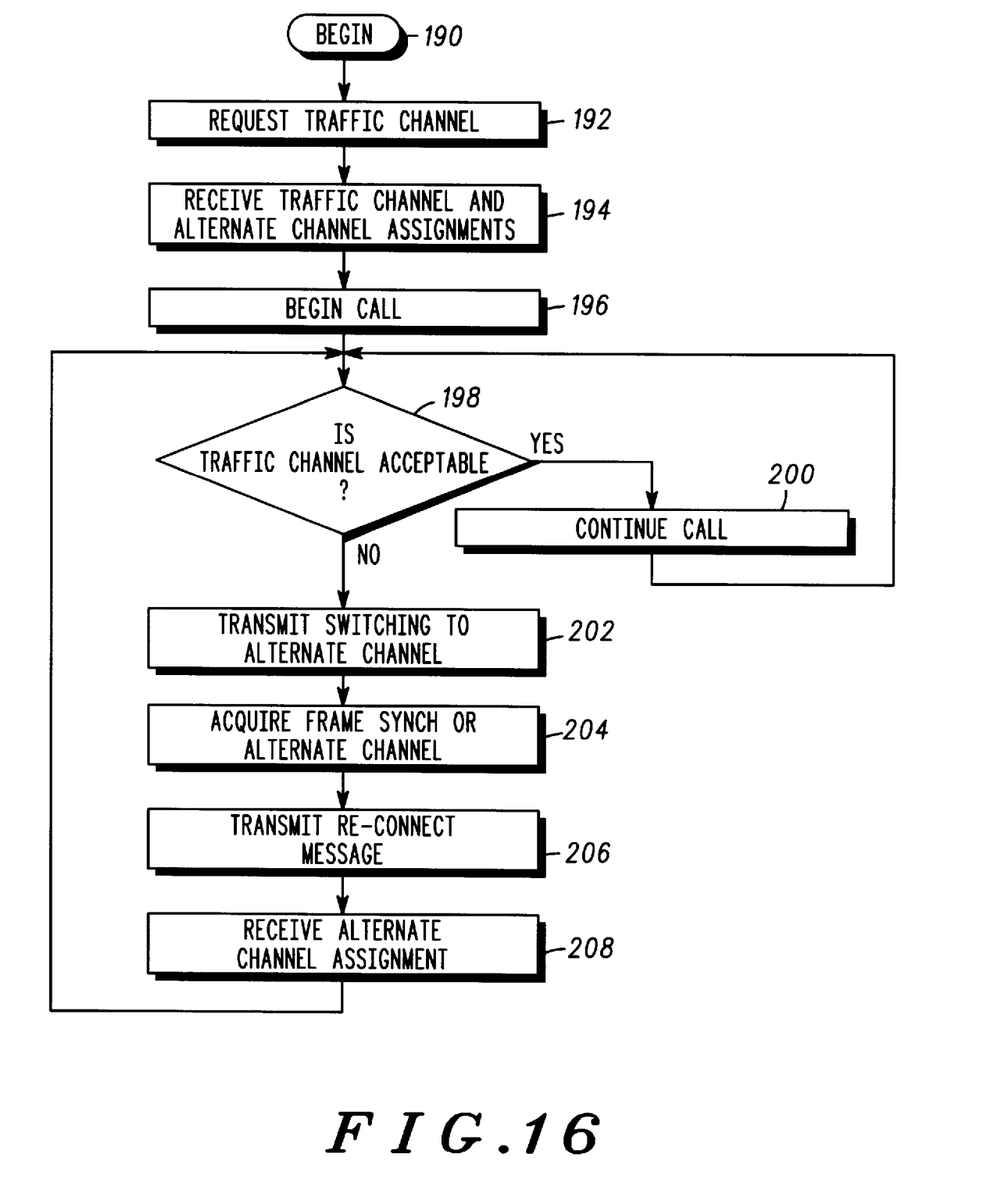
FIG. 16 is a flow chart of a process of a process embodying a method for switching to an alternate channel as performed by a cable access unit.

An embodiment of the process used by the CFAU to switch to the alternate channel is shown in FIG. 16. The process begins, step 190, by the CFAU requesting a traffic channel from the LAM, step 192. The CFAU then receives a traffic channel and at least one alternate channel assignment, step 194. The CFAU begins a call, step 196. The CFAU then monitors the traffic channel to determine if it is acceptable, step 198. How the CFAU and LAM determine if the traffic channel is acceptable is explained in conjunction with FIG. 17. As long as the traffic channel is acceptable, the call continues, step 200, and the CFAU monitors the traffic channel. When the traffic channel is not acceptable, the CFAU transmits a "Switching to Alternative Channel" message, step 202. In addition, the CFAU may receive a "Switching to Alternative Channel" message from the LAM. Either way the CFAU retunes to the alternative channel and acquires frame synchronization, step 204. The CFAU then transmits a "ReConnect" message, step 206. The CFAU the receives a new alternate channel assignment, step 208. The process then returns to step 198.

Figure 17:
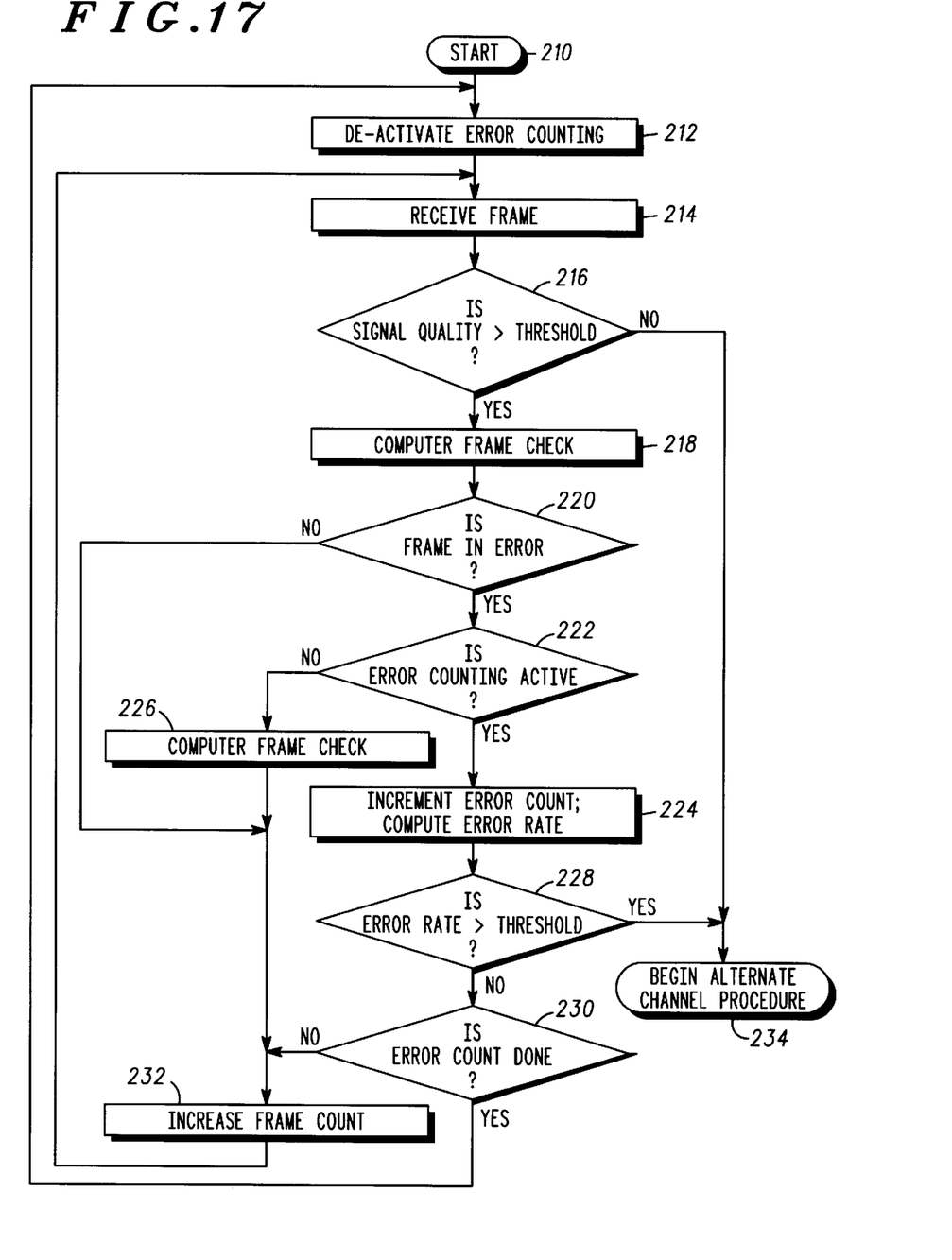
FIG. 17 is a flow chart of a process of a process embodying a method for determining if a traffic channel is acceptable.

An embodiment of the process used by the LAM and CFAU to determine if a traffic channel is acceptable is shown in FIG. 17. This process first determines if the signal quality is acceptable. Signal quality is measured continuously by the receiver circuit whenever any carrier is being received. The system switches to an alternative channel procedure, When the signal quality is unacceptable. When the signal quality is acceptable it is next determined if there are any un-correctable errors in the frame. Frames with un-correctable errors are unacceptable frames. In one embodiment the process determines the percentage of unacceptable frames and when this percentage exceeds a certain threshold the alternate channel procedure is begun. Normally, a moving sample of the percentage of unacceptable frames is preferred. As a result, the percentage is only kept over ten frames for example. After ten frames the counters are initialized and the process starts determining a new percentage.

The process starts at the beginning of a call, step 210, by deactivating the error counting (resetting the error count) at step 212. At step 214 a frame is received and it is determined if the signal quality is greater than a threshold, step 216. When the signal quality it not greater than a threshold, the alternate channel procedure is begun, step 234. When the signal quality is greater than a threshold, a frame check is computed, step 218. At step 220, it is determined if the frame is in error. When the frame is not in error, the frame counter is incremented at step 232. When the frame is in error, it is determined if error counting is active at step 222. When the error counting is not active, error counting is started by resetting the frame count and the error count at step 226 and the process returns to step 232. When error counting in active, the error counter is incremented and an error rate is computed, step 224. When the error rate is greater than a threshold, step 228, an alternate channel procedure is begun at step 234. When the error rate is less than a threshold, step 228, then it is determined if the error count is done, step 230. When the error count is done, then the process returns to step 212. When the error count is not done, the process returns to step 232.

Thus there has been described a method for avoiding interference in a cable telephony system has been described. The method explains how to select carriers for the system broadcast channel, the traffic channels and the alternative channels. In addition, the method describes how to determine when interference is unacceptable and how to switch to a previously selected alternative channel.

While the invention has been described in conjunction with specific embodiments thereof, it is evident that many alterations, modifications, and alterations will be apparent to those skilled in the art in light of the foregoing description. Accordingly, it is intended to embrace all such alterations, modifications, and variations in the appended claims.

We claim:

1. A method for avoiding ingress noise during a communication session over a cable system, the communication session communicating over a communication channel, comprising the steps of:

(a) receiving a traffic channel assignment, the traffic channel assignment designating a traffic channel, and an alternate channel assignment, the alternate channel assignment designating an alternate channel;

(b) determining that the traffic channel is unacceptable to use as the communication channel;

(c) transmitting a switching to alternate channel message over the traffic channel;

(d) acquiring the alternate channel as the communication channel; and (e) transmitting a re-connect request.

2. The method of claim 1, further including the step of requesting the traffic channel before step (a).

3. The method of claim 1, wherein step (a) further includes the step:

(a1) commencing a communication session.

4. The method of claim 1, wherein step (b) further includes the steps of:

(b1) receiving a frame;

(b2) classifying the frame as either acceptable or unacceptable;

(b3) when a first predetermined percentage of frames are unacceptable proceeding to step (c); and (b4) when a second predetermined percentage of frames is acceptable returning to step (b1).

5. The method of claim 4, wherein step (b1) further includes the steps of:

i) determining if a signal quality is greater than a threshold;

ii) when the signal quality is not greater than a threshold, proceeding to step (c).

6. The method of claim 1, wherein step (b) further includes the step of receiving a switching to alternative channel message and proceeding to step (d).

7. The method of claim 1, wherein step (c) further includes the step of:

(c1) tuning to the alternate channel.

8. The method of claim 1, further including the step of:

(f) receiving a new alternative channel assignment.

9. A method of avoiding interference in a cable telephony system comprising the steps of:

(a) categorizing each communication carrier from a plurality of communications carriers, based on usability, as either a preferred communication carrier or an ingress communication carrier, the preferred communication carriers so designated forming a preferred list and the ingress communication carriers so designated forming an ingress list;

(b) ranking the preferred communication carriers on the preferred list based on a signal quality;

(c) ranking the ingress communication carriers on the ingress list based on a elapsed time;

(d) ranking the plurality of communications carriers according to a frequency, to create a frequency list; and (e) selecting a communication channel from the plurality of communication carriers based on a type of channel and the communication carrier's ranking within at least one of: the preferred list, the ingress list or the frequency list.

10. The method according to claim 9, wherein step (e) further includes the step of:

(e1) when the type of channel is a system broadcast channel selecting as the communication channel the communication carrier that has a highest ranking on the preferred list.

11. The method according to claim 9, wherein step (e) further includes the steps of:

(e1) when determining which communication channel to assign for traffic, selecting as the communication channel the communication carrier having a high ranking on the preferred list; and (e2) when none of the preferred communication carriers are available, selecting the as the communication channel the communication carrier having a high ranking on the ingress list.

12. The method according to claim 9, wherein step (e) further includes the steps of:
(e1) when determining which communication channel to designate as an alternate channel, determining a position of a traffic channel on the frequency list; and
(e2) selecting the alternate channel from one of the plurality of communication carriers from the frequency list.

13. The method according to claim 12, wherein step (e2) further includes the step of selecting the alternate channel from the plurality of communication carriers that has a high ranking on the preferred list.

14. The method according to claim 13, further including the steps of:
(f) transmitting the traffic channel and the alternate channel to a subscriber unit;
(g) determining that the traffic channel is unacceptable;
(h) transmitting a switching to alternate channel message over the traffic channel;
(i) receiving a re-connect request.

15. The method according to claim 14, wherein step (g) further includes the steps of:
(g1) receiving a frame;
(g2) classifying the frame as either acceptable or unacceptable based on an quality metric;
(g3) when a first predetermined percentage of frames are unacceptable proceeding to step (h); and
(g4) when a second predetermined percentage of frames is acceptable returning to step (g1).

16. The method of claim 15, wherein step (g1) further includes the steps of:
i) determining if a signal quality is greater than a threshold;
ii) when the signal quality is not greater than a threshold, proceeding to step (c).

17. A method for avoiding ingress noise during a communication session over a cable system, comprising the steps of:
(a) receiving a traffic channel assignment and a alternate channel assignment, the traffic channel assignment selected from a preferred list of channels ranked by signal quality and the alternate channel assignment selected from a frequency list ranked by frequency;
(b) transmitting a switching to alternate channel message over the traffic channel in response to a determination that a traffic channel is unacceptable;
(c) acquiring an alternate channel; and
(d) transmitting a re-connect request.

18. The method of claim 17, further including the step of requesting the traffic channel before step (a).

19. The method of claim 17, wherein step (a) further includes the step:
(a1) commencing a communication session.

20. The method of claim 17, wherein step (b) further includes the step of receiving a switching to alternative channel message and proceeding to step (d).

* * * * *